INVENTOR:
ANTHONY P. COPPA,

AGENT

Aug. 18, 1970    A. P. COPPA    3,524,288
COMPLEX, NON-SPHERICAL STRUCTURES
Filed June 23, 1969    5 Sheets-Sheet 2

INVENTOR:
ANTHONY P. COPPA,
BY
AGENT

Aug. 18, 1970    A. P. COPPA    3,524,288
COMPLEX, NON-SPHERICAL STRUCTURES
Filed June 23, 1969    5 Sheets-Sheet 3

INVENTOR:
ANTHONY P. COPPA,
BY
AGENT

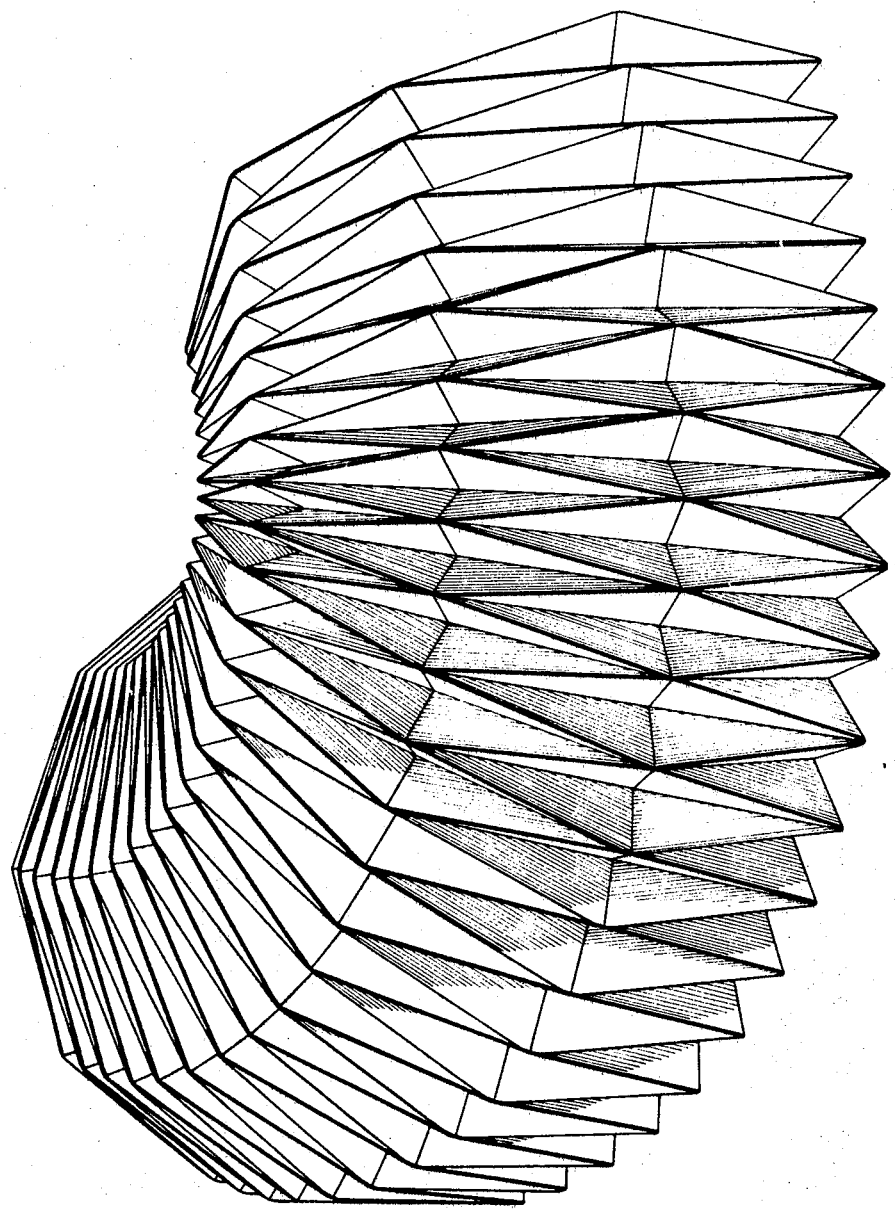

Aug. 18, 1970  A. P. COPPA  3,524,288
COMPLEX, NON-SPHERICAL STRUCTURES
Filed June 23, 1969  5 Sheets-Sheet 5

INVENTOR:
ANTHONY P. COPPA,
BY
ATTORNEY

United States Patent Office 3,524,288
Patented Aug. 18, 1970

3,524,288
COMPLEX, NON-SPHERICAL STRUCTURES
Anthony P. Coppa, Merion, Pa., assignor to General
Electric Company, a corporation of New York
Continuation-in-part of application Ser. No. 665,532,
Sept. 5, 1967. This application June 23, 1969, Ser.
No. 839,788
Int. Cl. E04b 1/343; E04h 1/12
U.S. Cl. 52—81                                    17 Claims

ABSTRACT OF THE DISCLOSURE

Non-spherical multi-planar element structures comprise triangular or trapezoidal elements undulating about imaginary conical parent shapes in precise geometrical arrays. Due to a dependency between axial flexibility and resistance to change in size and shape of the structures' perimeters at specific points in the structures, the structures of this invention may be rigid or flexible to a preselected degree. Flat and shell structures of specific shapes collapsible into highly compact masses are one form of the invention.

INTRODUCTION

This application is a continuation-in-part of my copending application Ser. No. 665,532, now abandoned, entitled Complex, Non-Spherical Structures which was filed Sept. 5, 1967.

This invention relates to complex non-spherical structures comprised of arrays of planar elements and particularly to structures of this type which are either rigid or erectible from a collapsed configuration.

BACKGROUND OF THE INVENTION

For reasons of structural efficiency, as well as esthetics, multiplanar element structures; i.e., shell structures comprised of arrays of planar elements, have become increasingly popular in the past few years. Typically these structures are limited to the general shapes of sphere segments and more specifically, domes. A practical means for utilizing this type of construction in practical, functional, non-spherical structures such as very high buildings or long narrow buildings has heretofore been unknown.

In another field entirely, rigid structures erectible from a collapsed configuration are potentially useful for easily transportable shelters in outer space and in remote locations on earth. The presently available erectible structures require improvements, particularly with regard to ease of erectibility, rigidity upon erection and compactness in the collapsed state, to be rendered practical.

With a view to these problems, it is an object of the present invention to provide a family of structures of various shapes which structures are characterized by a high degree of structural efficiency.

Another object of this invention is to provide novel, easily manufactured, non-spherical structures comprised of arrays of planar elements.

Still another object is to provide radially rigid, multi-planar element structures of complex shapes with predeterminable axial flexibility.

A further object of this invention is to provide a family of erectible, rigid structures.

Another object is to provide structures collapsible into extremely compact packages.

BRIEF DESCRIPTION OF THE INVENTION

These and other objects are met, in accordance with the present invention, by structures comprised of particular geometric arrays of planar elements each element having a base edge and two side edges. The planar elements may include, in addition, a second or minor base edge. Isosceles triangles and trapezoids are two of the more common shapes which the planar elements may take. Throughout the structure, side and base edges of each element coincide with respective side and base edges of adjoining elements.

In accordance with the present invention, the planar elements are arrayed such that they form an overall shape corresponding to and derived from at least a portion of an imaginary parent shape which is a simple cone or conical frustum. For present purposes the imaginary conical shape or parent cone is defined by the movement of a line, the generatrix, about an unmoving point, the apex, on the generatrix. Cylinders, wherein the apex is at infinity, and the cross section is a closed curve and right circular cones are special forms of parent shapes within the scope of the present invention. A series of parallel base planes are defined by the planar element base edges which also form perimeters of the structure in each base plane, said perimeters being either complete polygons or partial polygons closed by a connecting line.

Each planar element is one of a number in a layer bounded by two parallel base planes, one nearer the apex of the parent cone and one away from said apex. With reference to that base plane away from said apex, half of the planar elements, designated (+) elements, have a greater angle of inclination than that of the generatrix of the imaginary cone in the immediate vicinity of the respective (+) elements. The remaining half of planar elements, designated (−) elements, have a lesser angle of inclination than that of the generatrix in their respective vicinities. Throughout the structure, positive elements adjoin only negative elements and vice versa.

Generally, the perimeters formed by the base edges in the base planes tend to shorten as the structures of the present invention are collapsed. Conversely these perimeters tend to elongate upon erection of the structure from a collapsed state. This characteristic is useful in that various degrees of axial flexibility may be attained depending on the degree to which this shortening-elongating tendency is constrained or unconstrained. Furthermore in partial cone structures; i.e., structures having straight line-closed partial polygonal perimeters in the erected state, the shell of the structure is gradually drawn inward as the structure is collapsed resulting in a high degree of compactness in the collapsed structure.

DETAILED DESCRIPTION OF THE INVENTION

While the specification concludes with claims particularly pointing out and distinctly claiming the subject matter of the present invention, this invention may be better understood from the following description, taken in conjunction with the following drawings, in which:

FIG. 9 is a perspective view of a doubly curved multi-planar element structure;

Figure 1:
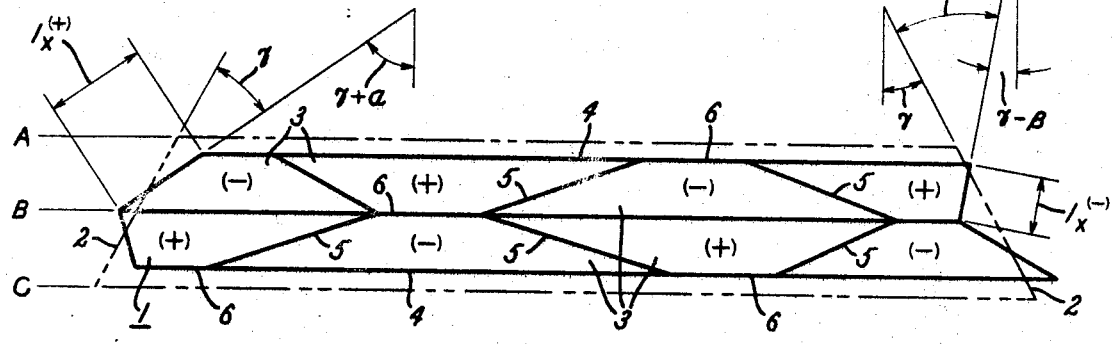
FIG. 1 is a side view of a simple form of the present invention.
Figure 2:
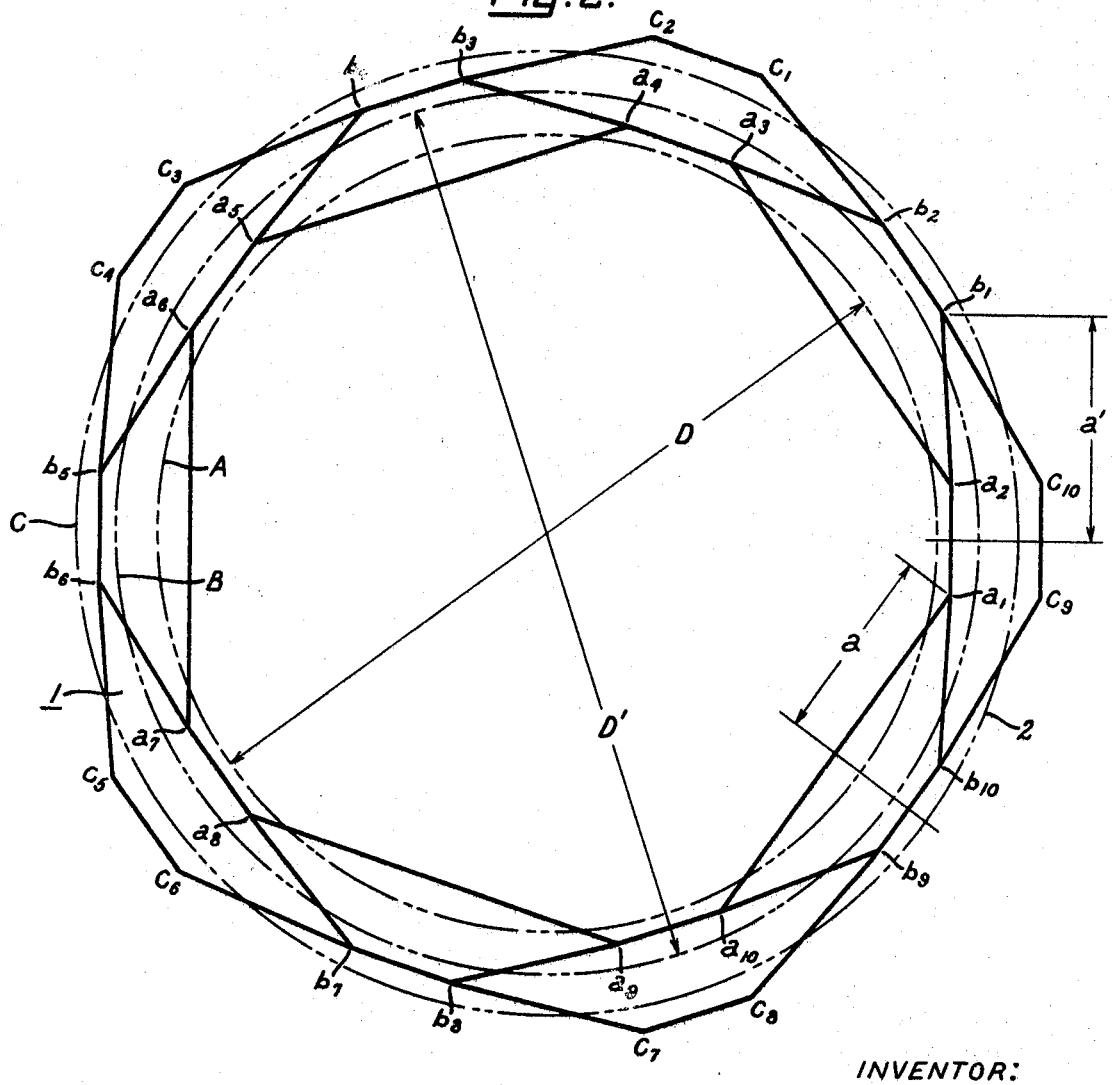
FIG. 2 is a top view of the form of the invention shown in FIG. 1.

Referring more specifically to FIGS. 1 and 2, there is shown a very simple structure 1 derived, in accordance with the present invention, from an imaginary parent conical frustum 2. Structure 1 comprises a plurality of isosceles trapezoidal planar elements 3, each having a base edge 4 and two side edges 5 along with a minor base edge 6. The planar elements 3 are arrayed such that the base edges 4, side edges 5 and minor base edges 6 all coincide respectively with similar edges of adjoining planar elements 3 or form part of the boundary of the structure. The base edges 4 and 6 of planar elements 3 define a series of polygonal base planes seen respectively in FIG. 2 as $a_1$, $a_{10}$, $b_1$, $b_{10}$ and $c_1$, $c_{10}$. The structure therefore is naturally divided into a series of layers or levels, each bounded by two polygonal parallel base planes, one nearer the apex of the parent conical frustum 2 and one away from that apex. A first half of planar elements are designated positive (+) elements. The enclosed angle between each (+) element and its respective polygonal base plane away from the apex of the parent conical surface is cylindrical. Similarly, a second half of (90°—$\gamma$) where 90°—$\gamma$ is the base angle of the parent cone and $\gamma$ is the semi-vertex angle of the parent conical frustum in the area of the particular (+) element under consideration. For $\gamma$ equal to 0° the the imaginary parent conical surface is cylindrical. Similarly, a second half of planar elements 3 are designed negative (—) planes. Each of these elements forms an angle with its respective polygonal base plane away from the apex of the parent cone of from greater than (90°—$\gamma$) to 180°. Throughout the structure (+) elements adjoin only (—) elements and vice versa.

For purposes of design, the configuration shown in FIGS. 1 and 2 is geometrically defined by its relationship to the right circular parent conical frustum and particularly to equivalent perimeter planar sections in the parent shape. Each such section corresponds to a layer of planar elements in structure 1. For example, the perimeter of section A in the parent shape 2 is equal to $a_1$, $a_{10}$, that of section B to $b_1$, $b_{10}$ and so forth. The quantity equal to 1 minus the ratio of the distance between adjacent parallel base planes in structure 1 to the distance between the equivalent perimeter planar sections in the parent shape is represented as a shortening factor $\epsilon$. In the structure shown in FIGS. 1 and 2, $\epsilon$ equals 0.228. Other variables of initial interest are:

$\gamma$=the semi-vertex angle of the parent conical frustum (30° in FIGS. 1 and 2)

$n$=number of cycles in the polygonal parallel base planes (5 in FIGS. 1 and 2)

$\lambda$=shape factor; ratio of minor base length to major base length of planar elements in any particular base plane (For example, in FIGS. 1 and 2:

$$\frac{a_1, a_2}{a_2, a_3} = \frac{b_1, b_2}{b_2, b_3} = 0.250)$$

The inclination of both positive and negative planar elements is seen best in FIG. 2, where the angles of rotation of the planar elements from the generatrix of the parent conical frustum are designated $\alpha$ and $\beta$ respectively. The slant length of the isosceles trapezoidal planar elements 3 are represented as $l_x^{(+)}$ and $l_x^{(-)}$. The axial shortening of the structure as compared to the parent cone is seen in FIG. 2 also. Other geometric relationships in this structure may then be defined as follows:

$$\frac{D'}{D} = \frac{1}{1+\lambda \cos \theta/2} \left[ \frac{\sin \theta/2}{K(+)} + \cos \frac{\theta}{2} + \lambda \right] \quad (1)$$

where $$\theta = \frac{2\pi \sin \gamma}{n}$$

and $$K^+ = \frac{a}{l_x^{(+)}}$$

(aspect ratio of (+) planes)

$D'/D$=ratio of the diameters of a parent cone section bounded by planes parallel to the structures' base planes having perimeters equal to those of the structure in corresponding base planes.

(a) For the (+) plane:

$$\sin (\gamma + \alpha) = \frac{\sin \theta/2}{\sin \pi/n} \frac{\left[ \frac{D'}{D}\left(1+\lambda \cos \frac{\pi}{n}\right) - \left(\cos \frac{\pi}{n}+\lambda\right) \right]}{\left[ \frac{D'}{D}(1+\lambda \cos \theta/2) - (\cos \theta/2+\lambda) \right]} \quad (2)$$

(b) For the (—) plane:

$$\sin (\gamma - \beta) = \frac{\sin \theta/2}{\sin \pi/n} \frac{\left[ \frac{D'}{D}\left(\cos \frac{\pi}{n}+\lambda\right) - \left(\lambda \cos \frac{\pi}{n}+1\right) \right]}{\left[ \frac{D'}{D}\left(\cos \frac{\theta}{2}+\lambda\right) - \left(\lambda \cos \frac{\theta}{2}+1\right) \right]} \quad (3)$$

(a) For the (+) plane: $K^{(+)}$=aspect ratio of (+) elements $$K^{(+)} = \frac{a}{l_x^{(+)}} = \frac{\sin \frac{\theta}{2}}{\frac{D'}{D}\left(1+\lambda \cos \frac{\theta}{2}\right) - \left(\cos \frac{\theta}{2}+\lambda\right)} \quad (4)$$

where $a=\frac{1}{2}$ major base length of (+) elements (b) For the (—) plane: $K^{(-)}$=aspect ratio of (—) planes $$K^{(-)} = \frac{a'}{l_x^{(-)}} = \frac{\sin \theta/2}{\cos \frac{\theta}{2}+\lambda - \frac{D}{D'}\left(1+\lambda \cos \frac{\theta}{2}\right)} \quad (5)$$

where $a'=\frac{1}{2} \times$ major base length of (—) elements $$\epsilon = 1 - \frac{\pi}{n} \frac{\tan \gamma}{(1+\lambda)\frac{D'}{D} - 1}$$

$$\left\{ \left[ \frac{\frac{D'}{D}(1+\lambda \cos \theta/2) - (\cos \theta/2+\lambda)}{\sin \theta/2} \right]^2 \right.$$

$$\left. - \left[ \frac{\frac{D'}{D}\left(1+\lambda \cos \frac{\pi}{n}\right) - \left(\cos \frac{\pi}{n}+\lambda\right)}{\sin \pi/n} \right]^2 \right\}^{\frac{1}{2}}$$

(6)

Figure 3:
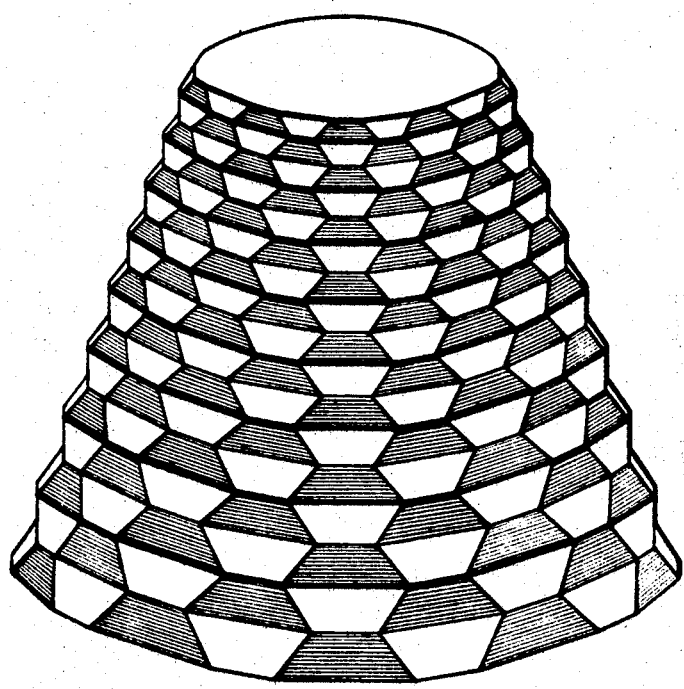
FIG. 3 shows a typical multiple level structure of the present invention.

The structures of the present invention defined by the foregoing mathematical relationships are limited to the following values:

$0 \leq \gamma < \pi/2$
$2 \leq n < \infty$
$0 \leq \lambda \leq 1$
$0 < \epsilon \leq 1$ A typical multi-level structure designed in accordance with the present invention is seen in FIG. 3.

To design any configuration, it is convenient to select particular values of $\gamma$, $n$, $\lambda$ and $K^+$ or $K'$ because by means of these the form may best be pre-visualized. The remaining values may then be computed. A check of the resultant value of the shortening factor $\epsilon$ is useful to determine the principle structural capability, once the form is established, because the axial stiffness of the structure will vary inversely and the radial stiffness will vary directly with the shortening factor.

It will be noted that the slant height of the negative and positive planar elements 3 are different and that in a structure based on a given parent cone the actual height, i.e., the distance between adjacent base planes, of each layer of planar elements will vary throughout the structure. Multiple level structure having constant height F at all levels may also be designed, however, and the geometry of such structures is also defined in terms of the diameter ratio $(D'/D)_m$ where $m$ is an entity representing the level, the geometric proportions of which are to be derived; the mathematical relationships are:

$$\left(\frac{D'}{D}\right)_m = J + \sqrt{J^2 - H_{m-1}} \qquad (7)$$

where $$J = \frac{(1+\lambda \cos \theta/2)(\cos \theta/2 + \lambda)\sin^2 \frac{\pi}{n} - \left(1+\lambda \cos \frac{\pi}{n}+\lambda\right)\sin^2 \frac{\theta}{2}}{\left(1+\lambda \cos \frac{\theta}{2}\right)^2 \sin^2 \frac{\pi}{n} - \left(1+\lambda \cos \frac{\pi}{n}\right)^2 \sin^2 \theta/2}$$

$$H_{m-1} = \frac{\left(\cos \frac{\theta}{2}+\lambda\right)^2 \sin^2 \frac{\pi}{n} - \left(\cos \frac{\pi}{n}+\lambda\right)^2 \sin^2 \theta/2 - K_{m-1}^2 \sin^2 \theta/2 \sin^2 \frac{\pi}{n}}{\left(1+\lambda \cos \frac{\theta}{2}\right)^2 \sin^2 \frac{\pi}{n} - \left(1+\lambda \cos \frac{\pi}{n}\right)^2 \sin^2 \theta/2}$$

$$K_{m-1} = (1+\lambda) \frac{2n}{\pi} \frac{F}{D_0} \left(\frac{D'}{D}\right)_1 \left(\frac{D'}{D}\right)_2 \left(\frac{D'}{D}\right)_3 \cdots \left(\frac{D'}{D}\right)_{m-1}$$

F = specified row height
$D_0$ = diameter of parent cone at smaller end.

Hence, by assigning F the value of the desired constant row-height, the diameter ratio of all rows is determined. From these values, all other pertinent quantities such as $K_m^{(+)}$, $K_m^{(-)}$, $(\gamma+\alpha)_m$, $(\gamma-\beta)_m$, and $\epsilon$ can then be found by using the Formulas 1–6.

For constant row-height forms having triangular faces ($\lambda = 0$), the coefficients in Equation 7 reduce to $$J = \frac{1 + \cos \theta/2 \cos \pi/n}{\cos \frac{\theta}{2} + \cos \frac{\pi}{n}}$$

$$H_{m-1} = 1 - \frac{K_{m-1}^2 \sin^2 \frac{\theta}{2} \sin^2 \frac{\pi}{n}}{\sin^2 \frac{\pi}{n} - \sin^2 \frac{\theta}{2}}$$

$$K_{m-1} = \frac{2n}{\pi} \frac{F}{D_0} \left(\frac{D'}{D}\right)_1 \left(\frac{D'}{D}\right)_2 \left(\frac{D'}{D}\right)_3 \cdots \left(\frac{D'}{D}\right)_{m-1}$$

Among the features of the present invention is the fact that while all structures within its scope are strong and relatively resistant to radial or non-axial forces, their axial rigidity is completely controllable. This controllability arises from the fact that the axial rigidity of the structures of the present invention is dependent primarily on the constraints on the structure's perimeters in its base planes. If the structure is elastic along its base edges so as to permit some lengthening or shortening of the polygonal perimeters, the structure will exhibit some axial flexibility. If the structure is inelastic along its base edges and these edges are constrained to resist separation or shape change of the structure's perimeters in its base planes, the structure will exhibit a high degree of axial rigidity. High axial rigidity is particularly useful in free standing structures, such as those shown in FIGS. 1, 2 and 3 wherein the perimeter of the structure is closed. Such structures exhibit high axial rigidity when the shortening factor $\epsilon$ is relatively small, preferably less than or equal to .2, so as to provide internal geometric constraints which obviate the need for external supports. By providing hinged joints along all coinciding edges of adjoining planar elements and a constraint-relieving means cutting through each of the base planes in the structure, such as a line of separation running generally axially along the structure, the resistance of this structure to axial forces is reduced practically to zero.

Figure 4:
FIG. 4 is a side view of a compact erectable structure.
Figure 5:
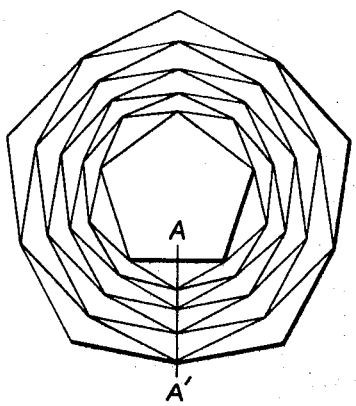
FIG. 5 is a front view of the erectable structure shown in FIG. 4.

Thus a collapsed structure, such as that shown in FIGS. 4 and 5, side and end views respectively, can be built. A line of separation AA' is shown in FIG. 5. The erection or unfolding of this structure upon the application of an axial tensile force, along with the separation of the structure along the constraint-relieving line of separation AA' results in a gradual opening of the closed polygonal base planes. Unfolding can also be effected by the elastic spring energy of hinge members between adjacent planar elements, thus producing a capability of self-erection.

Figure 6:
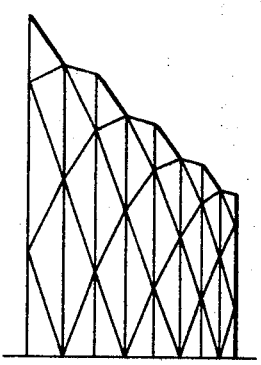
FIG. 6 is a side view of the structure shown in FIGS. 4 and 5 after it has been expanded.
Figure 7:
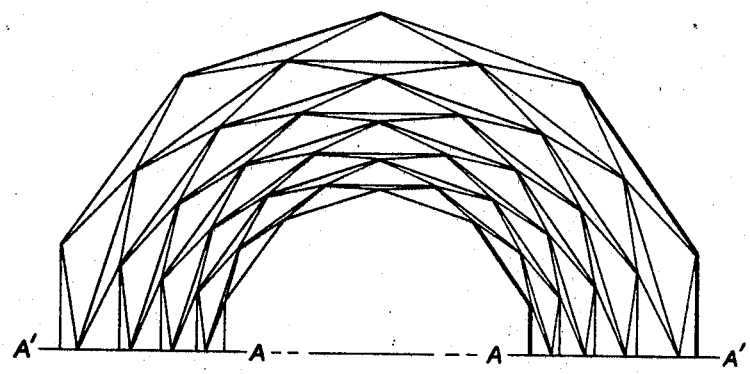
FIG. 7 is a front view of the expanded structure shown in FIG. 6.

The same structure after it has been erected, with the unfolding complete to the point where the structural elements along the line of separation AA' are rotated into a straight line or 180° relationship, is seen in FIGS. 6 and 7 side and end views respectively. The structure in erected form is inherently resistant to radial forces and, by providing constraints for the separated structure along the separation line AA', can also be rendered highly resistant to axial forces. Typically, a flat closure in registry with the various planar elements along the separation line AA' would complete the structure and form the constrained perimeters necessary to axial rigidity. When a collapsible form of the present invention, such as that shown in FIGS. 4–7, is fully unfolded, it is completely flat.

As is apparent from these figures the erected structure when folded is highly compact due both to axial shortening and to the rotational movement of the separated structure as it is erected. This compactness provides a high degree of transportability so that the structures lend themselves to uses such as space stations and portable shelters. A further improvement in compactness may be obtained by the design of structures based on non-concentric parent cones, such that upon collapse, one edge would rotate into and nest within the opposing edge of the axially split structure.

Figure 8:
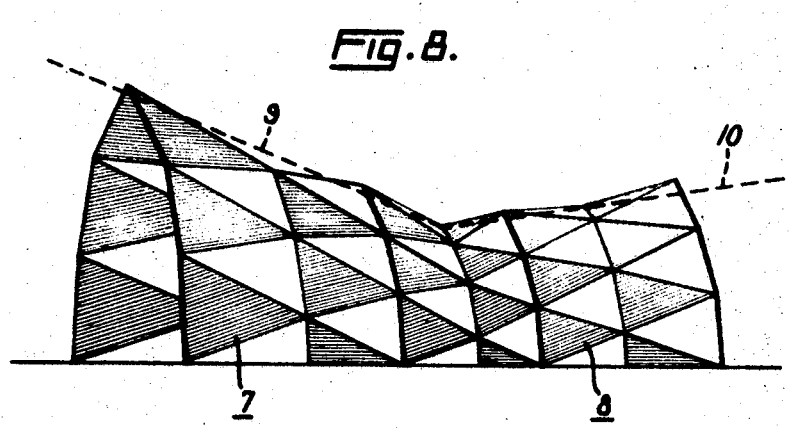
FIG. 8 is a perspective view of a composite multi-planar element structure.

Composite structures of complex shapes are another form of the present invention. One such structure, shown in FIG. 8, is a simple composite comprising two substructures 7 and 8 derived, in accordance with the present invention, from parent shapes 9 and 10. Thus complexly shaped structures may be formed by various combinations of substructures having different values of $\gamma$ and/or $\epsilon$.

Still other embodiments of the present invention include axially flexible cylindrical or conical configurations which may be used, for example, as a flexible connection for large conduits, etc. For such applications, some electricity along the base edges and some hinge-type flexibility at all adjoining planar elements edges are included to provide the desired degree of flexibility. For high axial flexibility configurations, the shortening factor $\epsilon$ is preferably within the range of .9 to 1.0.

Other modifications of the invention include doubly curved surfaces wherein at least a portion of the longitudinal axis of the structure is curved such as the toroidal, multi-planar element structure seen in FIG. 9.

Such structures may be derived from any parent cone but that shown in FIG. 8 is based on a right circular cylinder. Axially flexible structures may be erected into doubly curved structures by lengthening one side of the structure more or less than a diametrically opposite side of the structure. However, the base planes will remain substantially perpendicular to the longitudinal axis of the curved structure although all of them will not be parallel to one another as in a non-curved structure.

Figure 10:
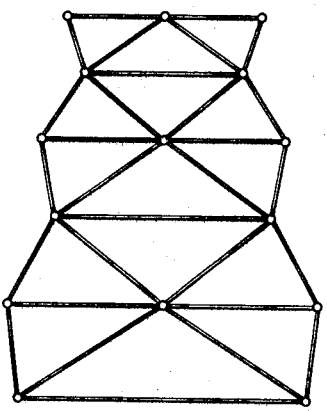
FIG. 10 is a side view of a truss element structure embodying the subject invention.
Figure 11:
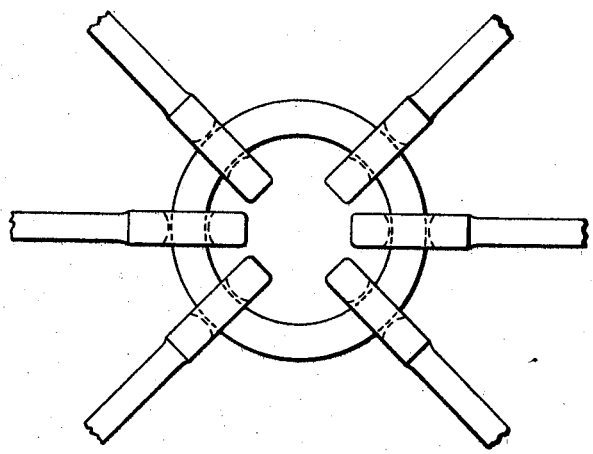
FIG. 11 is a view of one of the pin joints of the structure shown in FIG. 10.

Structures of the present invention have a high degree of structural efficiency due to the rigidizing effect produced in all adjacent planar elements by their common intersections. Such an arrangement results in a high effective wall stiffness throughout the entire structure and hence accounts for the great resistance to radial forces. Axial loads are resisted by virtue of the interaction between axial and circumferential contraction and expansion tendencies, as discussed previously. This interaction is due to the specific geometric design embodied in this invention and can best be illustrated by a pin-connected truss structure as shown in FIG. 10 corresponding geometrically to the lines of intersections in the multiplanar element structure. In this way, FIG. 10, shows another form of the subject invention in which the planar elements of the structure are considered to be comprised of truss elements at the edges thereof. Such a truss structure, even though the connections between the various truss elements are merely pinned, such as by the pin structure shown in detail in FIG. 11, will have substantial resistance to axial loads. In this case, axial compression loads are transmitted into the structure such that compression forces are borne by all slant elements and tension forces by all elements in the base planes.

While it has been known to form structures of triangular panel members to form a structure generally defined by a longitudinal section of a cylinder, the structures of the subject invention add new dimensions to the design and functional features obtainable in a structure formed of planar elements. Both collapsible and noncollapsible structures having closed perimeters and derived from any imaginary conical surface may be formed in accordance with the subject invention to have a predetermined amount of axial flexibility or rigidity within a wide range in accordance with the demands of any desired application. Such structures having non-closed perimeters derived from a non-cylindrical conical surface as well as structures having doubly curved shapes or structures combining together any combination of the structures mentioned above are within the scope of the subject invention.

While the present invention has been described with reference to particular embodiments thereof for purposes of clarity and convenience, it should be understood that numerous modifications may be made by those skilled in the art without departing from the invention's true spirit and scope.

What I claim as new and desire to secure by Letters Patent of the United States is:

1. A structure comprising
   (a) a multiplicity of planar elements, each having a base edge and two side edges;
   (b) said multiplicity being divided into a series of layers of planar elements, each layer bounded by a pair of base planes which are each perpendicular to the longitudinal axis of said structure;
   (c) the base edges of said planar elements defining a series of said base planes and polygonal perimeters of said structure in said planes;
   (d) all of said elements intersecting an imaginary conical surface;
   (e) a first half of said elements, designated positive elements having an angle of inclination, with respect to the base plane bounding said element away from the apex of said imaginary cone, less than the angle of inclination of the generatrix of said cone in the immediate vicinity of said element, said angle of inclination of the generatrix of said cone being greater than 0°;
   (f) a second half of said elements, designated negative elements having an angle of inclination, similarly determined, greater than said generatrix;
   (g) the base and side edges of each planar element coinciding with respective base and sides edges of adjoining planar elements;
   (h) all of said positive elements adjoining only negative elements and all of said negative elements adjoining only positive elements.

2. A structure, as recited in claim 1, wherein said planar elements comprises isosceles triangles.

3. A structure, as recited in claim 1, wherein said planar elements comprise isosceles trapezoids.

4. A structure, as recited in claim 1, wherein said planar elements comprise truss elements at the edges thereof.

5. A structure, as recited in claim 1, wherein said conical surface is derived from a right circular cone.

6. A structure, as recited in claim 1, wherein said planar element base edges are fixed in length and geometric relation to one another in each base plane, whereby said structure is rendered inflexible in the direction perpendicular to the base planes.

7. A structure, as recited in claim 1, wherein said planar element base edges are variable to a pre-selected degree in length and geometric relation to one another, whereby the flexibility of said structure in the direction perpendicular to said base planes is controlled.

8. A structure, as recited in claim 1, wherein all adjoining planar elements are hingedly attached to one another, whereby said structure is rendered more flexible in the direction perpendicular to said base planes.

9. A structure as in claim 1 wherein the shortening factor, $e$, thereof is no greater than .2.

10. A structure as in claim 1 wherein the shortening factor, $e$, thereof is between .9 and 1.0.

11. A structure as in claim 1 wherein at least a portion of the longitudinal axis of said structure is curved.

12. A structure as in claim 1 wherein each of said layers of planar elements is bounded by a pair of parallel base planes.

13. A structure comprising
   (a) a multiplicity of planar elements, each having a base edge and two side edges;
   (b) said multiplicity being divided into a series of layers of planar elements, each layer bounded by a pair of base planes which are each perpendicular to the longitudinal axis of said structure;
   (c) the base edges of said planar elements defining a series of said base planes and polygonal perimeters of said structure in said planes;
   (d) all of said elements intersecting an imaginary conical surface;
   (e) a first half of said elements, designated positive elements, having an angle of inclination, with respect to the base plane bounding said element away from the apex of said imaginary cone, less than the angle of inclination of the generatrix of said cone in the immediate vicinity of said element;
   (f) a second half of said elements, designated negative elements having an angle of inclination, similarly determined, greater than said generatrix;
   (g) the base and sides edges of each planar element coinciding with respective base and side edges of adjoining planar elements;
   (h) all of said positive elements adjoining only negative elements and all of said negative elements adjoining only positive elements;
   (i) wherein the perimeter of said structure is closed.

14. A structure as in claim 13 wherein each of said layers of plane elements is bounded by a pair of parallel base planes.

15. A structure as in claim 13 wherein the shortening factor, $e$, thereof is no greater than .2.

16. A structure as in claim 13 wherein the shortening factor, e, thereof is between .9 and 1.0.

17. A structure as in claim 13 wherein at least a portion of the longitudinal axis of said structure is curved.

References Cited

UNITED STATES PATENTS

| | | | |
|---|---|---|---|
| 2,918,992 | 12/1959 | Gelsavage | 52—81 |
| 2,982,290 | 5/1961 | Hunziker | 52—71 X |
| 3,016,115 | 1/1962 | Harrison et al. | 52—18 |
| 3,143,194 | 8/1964 | Hart | 52—80 X |
| 3,144,103 | 8/1964 | Krueger | 52—82 X |
| 3,186,524 | 6/1965 | Spaeth | 52—630 X |
| 3,346,998 | 10/1967 | Nelson | 52—81 X |

FOREIGN PATENTS 1,162,042  1/1964  Germany.

PRICE C. FAW, Jr., Primary Examiner

U.S. Cl. X.R.

52—71, 245; 160—352